United States Patent
Cole et al.

(10) Patent No.: US 12,242,991 B2
(45) Date of Patent: Mar. 4, 2025

(54) PREDICTIVE INVENTORY MANAGEMENT SYSTEMS AND METHODS OF USE

(71) Applicant: ADP, INC., Roseland, NJ (US)

(72) Inventors: Ramsay Cole, Roxbury, CT (US); Gil Gerstl, Cresskill, NJ (US)

(73) Assignee: ADP, Inc., Roseland, NJ (US)

( * ) Notice: Subject to any disclaimer, the term of this patent is extended or adjusted under 35 U.S.C. 154(b) by 76 days.

(21) Appl. No.: 17/346,751

(22) Filed: Jun. 14, 2021

(65) Prior Publication Data

US 2022/0398518 A1 Dec. 15, 2022

(51) Int. Cl.
*G06Q 10/00* (2023.01)
*G06Q 10/0631* (2023.01)
*G06Q 10/087* (2023.01)
*G06Q 30/0204* (2023.01)
*G06Q 20/20* (2012.01)
*G06Q 30/0283* (2023.01)
*G06Q 40/12* (2023.01)

(52) U.S. Cl.
CPC ..... *G06Q 10/06315* (2013.01); *G06Q 10/087* (2013.01); *G06Q 30/0205* (2013.01); *G06Q 20/203* (2013.01); *G06Q 30/0283* (2013.01); *G06Q 40/125* (2013.12)

(58) Field of Classification Search
None
See application file for complete search history.

(56) References Cited

U.S. PATENT DOCUMENTS

| | | | | |
|---|---|---|---|---|
| 7,398,232 B2* | 7/2008 | Renz | G06Q 10/06 |
| | | | 705/28 |
| 7,543,743 B1* | 6/2009 | Yu | G06Q 10/087 |
| | | | 705/28 |
| 9,098,852 B1* | 8/2015 | Dangott | G06Q 20/40 |
| 9,418,387 B1* | 8/2016 | Aaron | G06Q 40/125 |
| 9,805,330 B2* | 10/2017 | Surendra | G06Q 10/067 |
| 2003/0144897 A1* | 7/2003 | Burruss | G06Q 30/0202 |
| | | | 705/7.31 |
| 2006/0277130 A1* | 12/2006 | Harmon | G06Q 30/06 |
| | | | 705/35 |
| 2008/0162270 A1* | 7/2008 | Kim | G06Q 30/0202 |
| | | | 705/7.31 |
| 2009/0076896 A1* | 3/2009 | DeWitt | G06Q 30/0215 |
| | | | 705/14.17 |
| 2011/0106610 A1* | 5/2011 | Landis | G06Q 30/02 |
| | | | 705/14.66 |

(Continued)

OTHER PUBLICATIONS

JR Albert, C De Dios, A Martinez et al. (Readiness of National Statistical Systems in Asia and the Pacific for Leveraging Big Data to Monitor the SDGs)—2019—adb.org. (Year: 2019).*

*Primary Examiner* — Hafiz A Kassim
(74) *Attorney, Agent, or Firm* — Foley & Lardner LLP (57) ABSTRACT

The present disclosure relates to management of inventories and supply chains and, more particularly, to a predictive inventory management system and methods of use. The method of inventory management, includes: obtaining information associated with an item; predicting demand of the item based on the obtained information; determining whether additional inventory is required based on the predicted demand of the item; and obtaining additional inventory of the item when the current inventory level does not match the predicted demand.

15 Claims, 4 Drawing Sheets

(56) References Cited

U.S. PATENT DOCUMENTS

| | | | | |
|---|---|---|---|---|
| 2012/0271740 A1* | 10/2012 | Connors | .............. | G06Q 10/087 |
| | | | | 705/28 |
| 2013/0231974 A1* | 9/2013 | Harris | ................ | G06Q 30/0201 |
| | | | | 705/7.29 |
| 2014/0200958 A1* | 7/2014 | Wagenblatt | ........ | G06Q 30/0202 |
| | | | | 705/7.31 |
| 2016/0171536 A1* | 6/2016 | Garg | .................. | G06Q 30/0255 |
| | | | | 705/14.53 |
| 2016/0171540 A1* | 6/2016 | Mangipudi | ........ | G06Q 30/0255 |
| | | | | 705/14.53 |
| 2018/0300796 A1* | 10/2018 | Nair | ................... | G06Q 30/0633 |
| 2019/0325366 A1* | 10/2019 | Newman | ............ | G06Q 30/0205 |
| 2020/0363920 A1* | 11/2020 | Ignatyev | ............. | G06F 16/2228 |
| 2021/0224736 A1* | 7/2021 | Abrahamson | ...... | G06Q 10/0833 |

* cited by examiner

PREDICTIVE INVENTORY MANAGEMENT SYSTEMS AND METHODS OF USE

TECHNICAL FIELD

The present disclosure relates to management of inventories and supply chains and, more particularly, to a predictive inventory management system and methods of use.

BACKGROUND

Maintaining healthy inventory levels to reduce unnecessary working capital, storage costs and waste while also minimizing stock outs is especially difficult for companies. In fact, companies always strive for better and more efficient ways to achieve this delicate balance in order to more effectively management inventory and supply chains.

By the proper management of inventory and supply chains, it is possible to lower cost structures. For example, not knowing when to restock inventory, what amount to purchase or produce, what to provide for consumer sale and its sale price can detrimental to any business.

SUMMARY

In a first aspect of the present disclosure, a method of inventory management, comprises: obtaining, by a computer system, information associated with an item; predicting, by the computer system, demand of the item based on the obtained information; determining, by the computer system, whether additional inventory is required based on the predicted demand of the item; and obtaining, by the computer system, additional inventory of the item when the current inventory level does not match the predicted demand.

In another of the aspect of the disclosure, there is a computer program product for generating predictive inventory analysis. The computer program product includes a computer usable storage medium having program code embodied in the storage medium. The program code is readable/executable by a computing device to provide any combination of the steps and/or functionality disclosed herein.

In a further aspect of the present disclosure, there is a computer system for generating predictive inventory analysis. The system includes a CPU, a computer readable memory and a computer readable storage medium. Additionally, the system includes one or more program instructions. The program instructions are operable to generating predictive inventory analysis by providing any combination of the steps and/or functionality described herein. The program instructions are stored on the computer readable storage medium for execution by the CPU via the computer readable memory.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION OF ASPECTS OF THE PRESENT DISCLOSURE

The present disclosure relates to the management of inventories and supply chains and, more particularly, to a predictive inventory management system and methods of use. In accordance with aspects of the disclosure, the predictive inventory management system drives inventory decisions by predicting demand for specific items across geographies using a host of data points. Advantageously, the predictive inventory management system will significantly increase efficiencies in inventory management which translates into cost savings and increased profits.

In embodiments, the predictive inventory management system can be implemented in a computer program product or computing system as described in more detail herein. The predictive inventory management system provides the technological feature of effectively managing a supply chain for a business to achieve near term balance of inventories and to drive future inventory decisions by predicting demand for specific items across geographies. In more specific embodiments, the predictive inventory management system can generate communicable and predictive inventory management plans for exact product item placement by business location or other criteria thereby providing a technical solution to the technical problem of management of supply chains. The predictive inventory management system can make such predictions using disparate data across multiple feeds, e.g., payroll information, spending data, geo-location information of consumers, etc.

Figure 1:
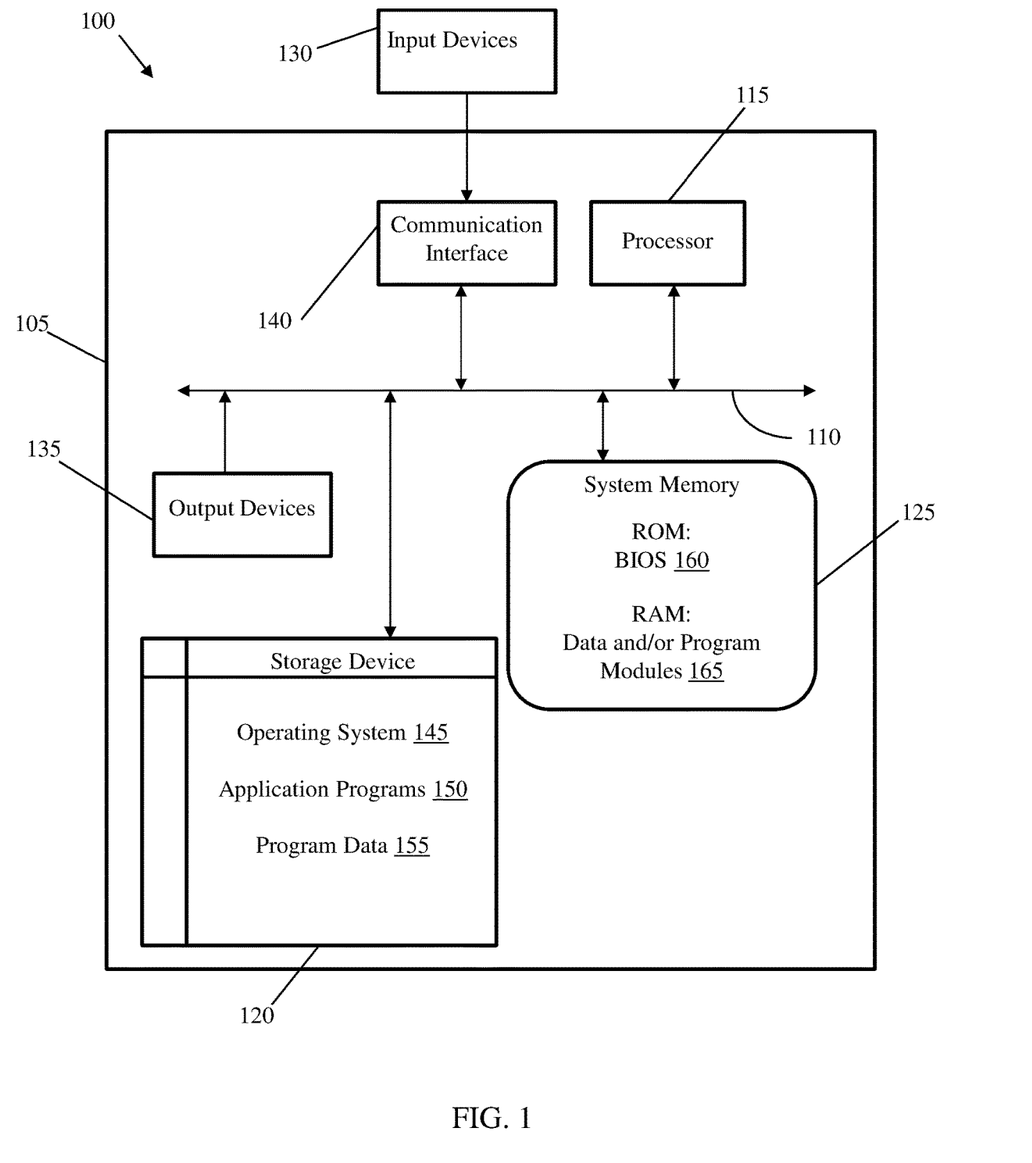
FIG. 1 is an illustrative architecture of a computing system implemented as embodiments of the present disclosure.

FIG. 1 is an illustrative architecture of a computing system 100 implemented as embodiments of the present disclosure. The computing system 100 is only one example of a suitable computing system and is not intended to suggest any limitation as to the scope of use or functionality of the present disclosure. As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 105 is configured to gather (e.g., pull) data across a variety of sources (multiple feeds) such as, e.g., aggregated employment and income data in granular geographic locations, as well as geo-coded transactional data (spend data), commute and migration data (using, e.g., cellphone and satellite data) alongside data collection from a number of additional sources such as the point of sale (POS) systems within a radius of the company locations. The processer 105 is also configured to collate such data and use it to predict necessary inventory levels, e.g., whether inventory is over or under stocked at a certain location, and further determine appropriate pricing of certain items at certain times, e.g., days, weeks, months, etc. The processer 105 is also configured to use this data to determine demand for certain items across geographic locations, temporally, or other criteria to provide ideal pricing for such items at certain times and certain locations.

In embodiments, processor 115 may receive input signals from one or more input devices 130 and/or drive output signals through one or more output devices 135. The received input signals may be the data (received information) used by processor 115 to provide the functionality of the systems and methods described herein. The output devices 135 can be, for example, any display device, printer, audio speakers, etc.

In embodiments, input devices 130 may be any system (e.g., feed) which can collect and provide information to the system 100, in order to determine appropriate inventory levels and/or pricing for a business. For example, input device 130 may be a point of sale (POS) terminal. The POS terminal can be used to collect information about sales of certain items including time of sales, amount of sales, location of sales, and pricing, etc. This information can be used to directly manage inventory, in real-time. For example, as a certain item is sold, an order for the same item can be made in order to restock the item at a certain location.

The input devices 130 can also include satellite or cellular telephone feeds to obtain geo-location of potential customers. This information can include commuter information or other migration information of the potential customers. This location information can assist in determining whether customers tend to be within the vicinity (e.g., predetermined distance) of the business during certain times. This information can also be collated with the purchase of certain items. For example, it may be determined that customers are near the business during working hours, compared to weekends, in which case inventory can be adjusted, e.g., increased, during the work week. In this way, inventory can be adjusted based on customer location and, in embodiments, known spending habits when they are in or about certain locations.

The input devices 130 can also include payroll information obtained from third party suppliers, e.g., ADP. This information can be used to determine a correlation between payroll and spending habits within certain locations and at certain times. For example, it may be found that spending is directly related to a payroll event (e.g., payment of a weekly, bi-weekly or monthly salary). This information is correlated to increase sales of certain items, e.g., foodstuffs or other necessities. In such instances, the systems and methods of the present disclosure are configured to then correlate this information to ensure that inventory for certain items are increased at certain locations within a certain amount of time after a payroll event.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a the input devices 130, mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to perform the tasks as described herein (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

Figure 2:
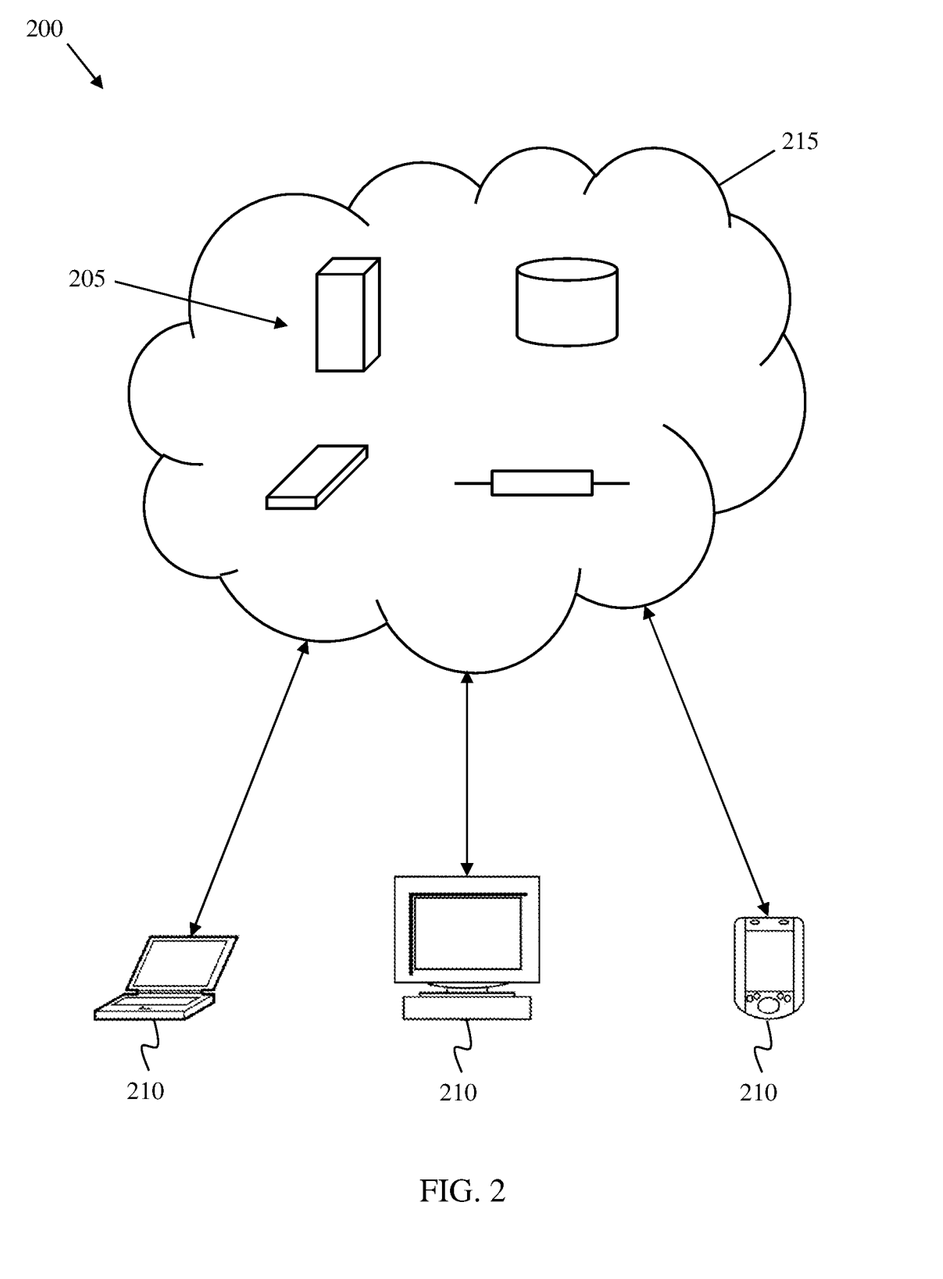
FIG. 2 shows an exemplary cloud computing environment in accordance with aspects of the disclosure.

FIG. 2 shows an exemplary cloud computing environment 200 which can be used to implement the methods and systems described herein. Cloud computing enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, POS terminals, laptop computers, handheld computers (e.g., smartphones, tablet computers, cellular telephones), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
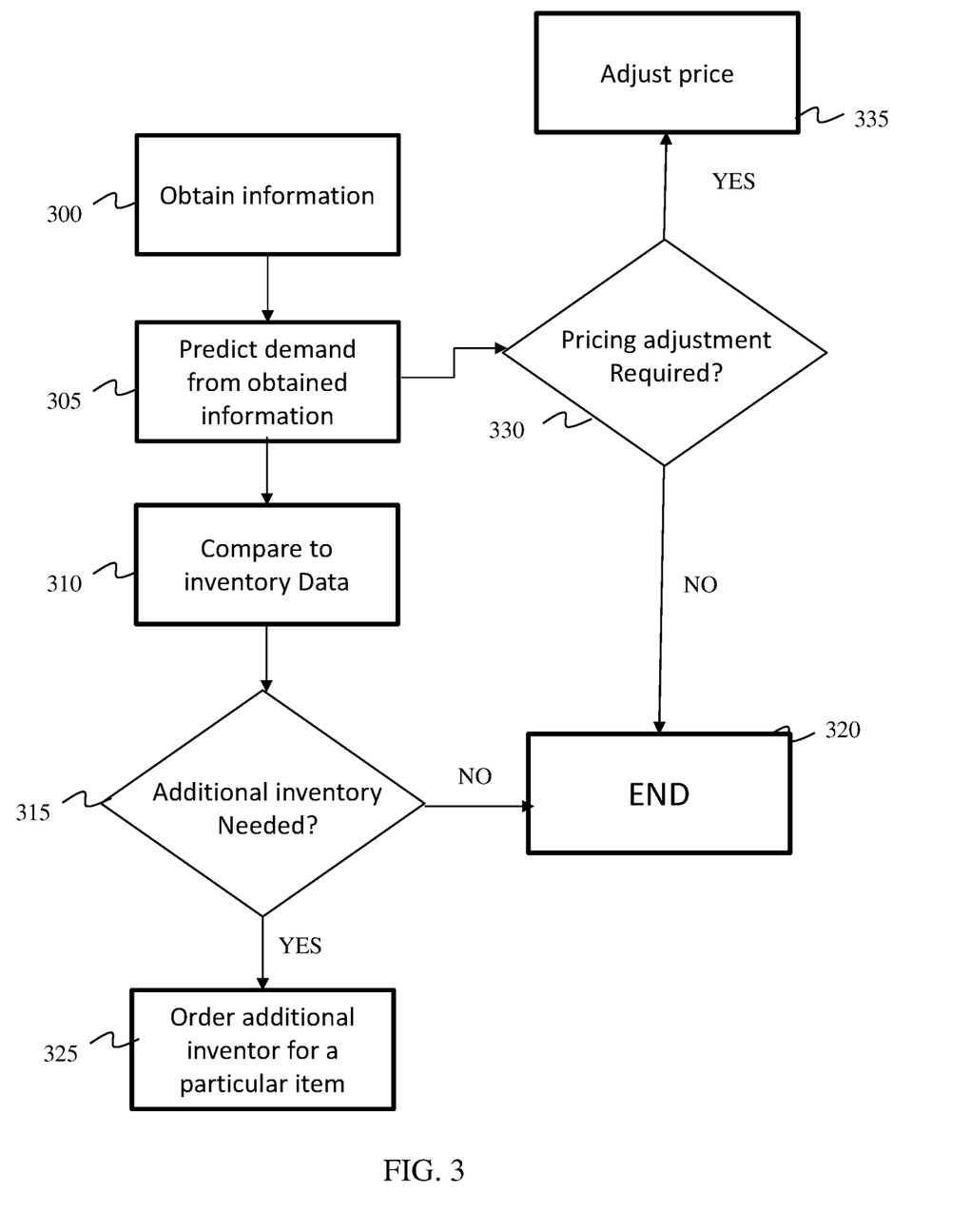
FIG. 3 depicts an exemplary flow for a process in accordance with aspects of the present disclosure.

FIG. 3 depicts an exemplary flow for processes in accordance with aspects of the present disclosure. The exemplary flow can be illustrative of a system, a method, and/or a computer program product and related functionality implemented on the computing system of FIG. 1. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow of FIG. 3 can be downloaded to respective computing/processing devices, e.g., computing system of FIG. 1 as already described herein, or implemented on a cloud infrastructure as described with regard to FIG. 2. It should be understood that the steps of FIG. 3 can be provided in a different order.

At step 300, the system obtains information from one or more sources, e.g., multiple feeds. As already described herein, the information can be payroll information, spending data (e.g., credit card, debit card or other electronic transaction information), migration or geo-location data (e.g., satellite or cellular telephone data), commuter information, point of sale data, historical inventory data for certain locations, etc. At step 305, the system predicts demand of certain items or services based on the information obtained in step 300. This prediction can be predicated upon a certain demand for the item or services at a particular location of a particular business at a certain defined time period. Similarly or in any combination, the prediction can be predicated upon historical sales of the items, spending habits of consumers, proximity of the consumers to the business location, and/or proximity to a payroll event, etc. In embodiments, a score can be created based on any of the above factors, with a higher score having a higher weighting factor in the prediction. For example, the spending habits of a consumer or a payroll event may be scored higher than the consumer's proximity to the business.

At step 310, the system compares the predicted demand of an item and/or service to current inventory information at certain locations of the business. At step 315, a determination is made as to whether the current inventory meets the predicted demand for a certain item. If demand is met, the process ends at step 320. If demand is not predicted to be met, the process continues to step 325, at which time additional inventory for a particular item can be ordered to meet the predicted demand.

Still referring to FIG. 3, after step 305, the system is configured to determine whether a pricing adjustment is required based on, for example, predicted demand of the item (step 330). The pricing adjustment may be based on, for example, whether the particular item has been in inventory for a predetermined amount of time, whether the particular item has historically been under or overstocked, etc. If no pricing adjustment is required, the process proceeds to step 320 and ends. On the other hand, if a pricing adjustment is required, the process continues to step 335, at which time the price for a particular item may be increased or decreased based on the demand for such item. In this way, the systems and methods described herein are configured to determine whether a particular item is correctly priced based on the number of days it may be available in the store or, alternatively, its inventory level during known times and locations where such an item should have performed in a certain manner (e.g., expected to perform well, but did not meet expectations, etc.). In this way, the information obtained in step 300 can be used for inventory planning and pricing based on, for example, store location and/or other factors described herein.

Figure 4:
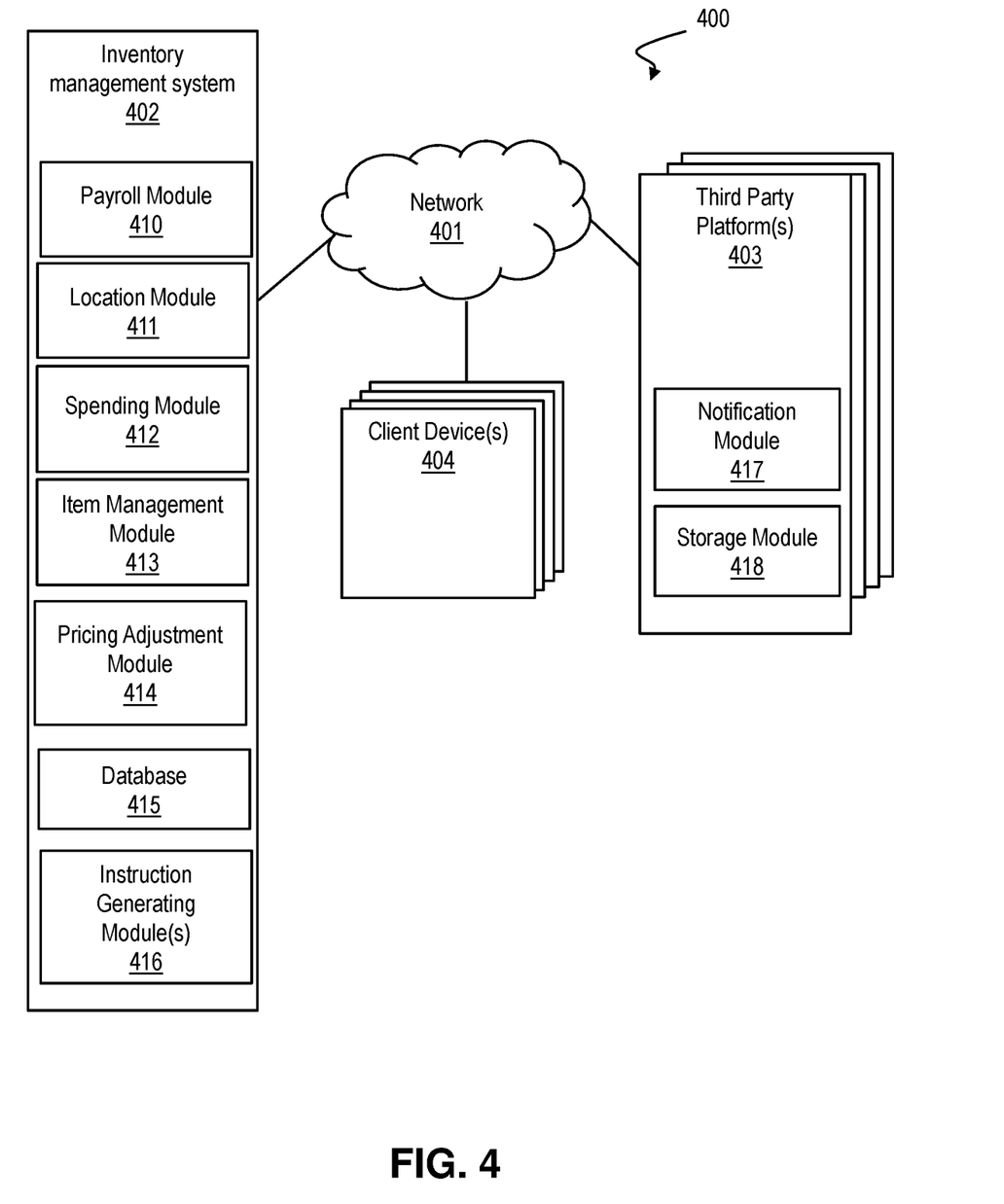
FIG. 4 depicts an exemplary block diagram of an environment for implementing the processes in accordance with aspects of the present disclosure.

FIG. 4 depicts an exemplary environment in accordance with aspects of the present disclosure. More specifically, FIG. 4 depicts an exemplary electronic environment 400 that illustrates functionality of aspects of the present disclosure. The environment 400 includes a network 401 (e.g., Internet) interconnecting an inventory management system 402 with one or more third party platforms 403 and one or more client devices 404. In implementations, the inventory management system 402 is configured to automate inventory management for businesses in order properly manage inventory and/or prices.

The inventory management system 402 may comprise one or more cloud resources 205 within the cloud computing environment 200 of FIG. 2, and may comprise one or more computing devices including the elements of computing device 105 of FIG. 1. In implementations, the inventory management system 402 is a cloud network platform providing cloud-based electronic services to retailers and/or other vendors of goods and/or services (via a local area network (LAN) or wide area network (WAN) or virtual private cloud (VPC) as further non-limiting examples.

In one example, the inventory management system 402 includes software tools to provide advanced capabilities to automate inventory management of goods and/or services. In implementations, the inventory management system 402 may comprise one or more modules for performing functions in accordance with embodiments of the present disclosure. In implementations, the inventory management system 402 includes, for example, payroll module 410, location module 411, spending module 412, item management module 413, pricing adjustment module 414, database 415 and one or more instruction modules 416, wherein each of the above-identified modules may comprise one or more program modules such as program modules 165 described with respect to FIG. 1.

In embodiments, the payroll module 410 is configured to monitor and/or determine a pay period of a potential customer. For example, the payroll module can use APIs to access a payroll company database to determine and/or monitor payroll information. In addition or alternatively, the payroll module 410 is configured to provide aggregated employment and income data. The location module 411 is configured to monitor and/or determine a location of a potential consumer. The spending module 412 is configured to determine spending habits of customers based on past spending habits. This information may be obtained from banking information or credit card information, POS systems of the business, as examples. The location, spending and payroll information can be used to determine a correlation between payroll and spending habits within certain locations and at certain times. And, using this information, the inventory management system may make recommendations to adjustments of inventory using, for example, the instruction generating module 416.

The item management module 413 is configured to monitor purchases within the business, in addition to determining what items (i.e., inventory) need to be replenished, what inventory is sitting on the shelves and for how long, and which inventory item sells better than other inventory items. In this way, the system is configured to determine the need of certain inventory items.

Pricing adjustment module 414 is configured to determine whether certain items sell better at certain price points. By using such information, the pricing adjustment module 414 is configured to recommend price adjustments depending on many different factors including, for example, how long an item remains unsold, how many items are being sold within a certain time frame, etc. Based on these and other criteria, the pricing adjustment module may dynamically adjust a price of an item based on past performances. The database 415 can store the information which was obtained, and can also be accessed by any of the modules for such modules to obtain any additional information used for obtaining its functionality.

The instruction generating module 416 is configured to use the obtained information from any combination of the modules in order to make inventory recommendations as described herein. For example, instruction generating module 416 may provide instructions to the third party platform 403 to adjust its inventory based on payroll information, location information, current inventory, etc. This information may be provided to the third party platform by way of the network 401. In embodiments, the third party platform 403 may include a notification module 417, which notifies the user that a recommendation has been made for the inventory management of their inventory. The recommendation may be stored in the storage module 418.

The client devices 404 may comprise the client devices 210 in the cloud environment 200 of FIG. 2, or may comprise one or more cloud resources 205 of FIG. 2. Further, the client devices 404 may comprise one or more computing devices including the elements of computing device 105 of FIG. 1. In implementations, one or more of the client devices 404 may belong to consumers. In alternate embodiments, the one or more of the client devices 404 comprise backend computing devices providing the location or payroll or other information, as examples. In further implementations, one or more modules and/or systems utilize one or more application programming interfaces (APIs) to implement communication between the different systems and/or modules for implementing steps of the present disclosure.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of inventory management, comprising:
receiving, by a computer system comprising one or more processors, via a communication interface, an input signal indicative of location information associated with a device, the location information determined using one or more satellites;
determining, by the computer system in response to receiving the input signal, a first geolocation of the device associated with an item within a threshold distance to an entity associated with the item based on the location information from the device determined using the one or more satellites;
obtaining, by the computer system, information associated with the item from sources comprising at least the device and at least one point of sale (POS) terminal device, the information associated with the item comprising the first geolocation of the device associated with the item, payroll data associated with the device, and pull data uploaded to the computer system from the POS terminal device associated with at least the entity, wherein the pull data is indicative of a plurality of exchanges of at least the item at a plurality of time periods;
generating, by the computer system, a first score for the first geolocation, a second score for the payroll data, and a third score for the pull data, wherein a corresponding value of each of the first score, the second score, and the third score is proportional to a corresponding weight applied to each of the first geolocation, the payroll data, and the pull data, respectively;
predicting, by the computer system, demand of the item for a second entity based on the obtained information by weighting the first geolocation, the payroll data, and the pull data by the first score, the second score, and the third score, respectively, to determine correlations between the first geolocation, the payroll data associated with the device, the pull data uploaded from the POS terminal device associated with at least the entity, and a second geolocation associated with another device at the second entity, wherein the second geolocation is based on second location information determined using the one or more satellites;
determining, by the computer system, that a current inventory level of the second entity is below a threshold inventory level based on the predicted demand of the item;
determining, by the computer system, an adjustment of the value of the item based on the predicted demand of the item;
generating, by the computer system, one or more instructions to cause the one or more processors to request additional inventory of the item at the second entity and initiate the adjustment of the value of the item, responsive to determining that (i) the current inventory level of the second entity is below the threshold inventory level, and (ii) the demand is greater than a threshold or less than the threshold;
providing, by the computer system, for display via a web browser, a notification recommending execution of the one or more instructions to request the additional inventory of the item and adjust the value of the item, the execution of the one or more instructions controllable by the second entity;
receiving, by the computer system, from an input device, an indication of interaction via the web browser to execute at least a portion of the one or more instructions to request the additional inventory of the item and adjust the value of the item;
obtaining, by the computer system, in response to receiving the indication of interaction via the web browser to execute at least the portion of the one or more instructions, the additional inventory of the item based on the instructions being executed;
automatically adjusting, by the computer system, the value of the item in response to receiving the indication of interaction via the web browser to execute at least the portion of the one or more instructions; and
providing, by the computer system, for display via the web browser in response to obtaining the additional inventory, at least one of an indication of the additional inventory being requested at the second entity and the adjusted value of the item.

2. The method of claim 1, wherein the information associated with the item comprises geo-location of potential customers and location of a business that is selling the item.

3. The method of claim 2, wherein the geo-location of potential customers includes a time period in which the geo-location of potential customers are within a predetermined distance from the business which is correlated to an increase in sales of the item.

4. The method of claim 1, wherein the information associated with the item comprises spending habits on the item when a potential customer is in or about certain locations.

5. The method of claim 1, wherein the information associated with the item comprises aggregated employment and income data in granular geographic locations.

6. The method of claim 1, wherein the information associated with the item comprises geo-coded transactional data.

7. The method of claim 1, wherein the information associated with the item comprises commute and migration data.

8. The method of claim 7, wherein the commute and migration data comprises cellphone and satellite data.

9. The method of claim 1, wherein the information associated with the item comprises POS information of the item within a radius of a certain location.

10. The method of claim 1, wherein the information associated with the item comprises inventory levels and/or historical inventory levels.

11. The method of claim 1, wherein the information associated with the item comprises pricing of the item.

12. The method of claim 1, further comprising generating communicable and predictive inventory management plans for exact product item placement by business location based on the information associated with the item.

13. The method of claim 1, further comprising correlating the payroll data to an increase in sales of the item.

14. The method of claim 1, further comprising determining a price of the item based on the information associated with the item.

15. A computer program product comprising computer readable program instructions stored on computer readable storage medium, the computer readable program instructions causing a computing device to perform the steps of:
- receiving, via a communication interface, an input signal indicative of location information associated with a device, the location information determined using one or more satellites;
- determining, in response to receiving the input signal, a first geolocation of the device associated with an item within a threshold distance to an entity associated with the item based on the location information from the device determined using the one or more satellites;
- obtaining information associated with the item from sources comprising at least the device and at least one point of sale (POS) terminal device, the information associated with the item comprising the first geolocation of the device associated with the item, payroll data associated with the device, and pull data uploaded to the computer device from the POS terminal device associated with at least the entity, wherein the pull data is indicative of a plurality of exchanges of at least the item at a plurality of time periods;
- generating a first score for the first geolocation, a second score for the payroll data, and a third score for the pull data, wherein a corresponding value of each of the first score, the second score, and the third score is proportional to a corresponding weight applied to each of the first geolocation, the payroll data, and the pull data, respectively;
- predicting demand of the item for a second entity based on the obtained information by weighting the first geolocation, the payroll data, and the pull data by the first score, the second score, and the third score, respectively, to determine correlations between the first geolocation, the payroll data associated with the device, the pull data uploaded from the POS terminal device associated with at least the entity, and a second geolocation associated with another device at the second entity, wherein the second geolocation is based on second location information determined using the one or more satellites;
- determining that a current inventory level of the second entity is below a threshold inventory level based on the predicted demand of the item;
- determining, by the computer device, an adjustment of the value of the item based on the predicted demand of the item;
- generating one or more instructions to cause one or more processors to request additional inventory of the item at the second entity and initiate the adjustment of the value of the item, responsive to determining that (i) the current inventory level of the second entity is below the threshold inventory level, and (ii) the demand is greater than a threshold or less than the threshold;
- providing for display via a web browser, a notification recommending execution of the one or more instructions to request the additional inventory of the item and adjust the value of the item, the execution of the one or more instructions controllable by the second entity;
- receiving, from an input device, an indication of interaction via the web browser to execute at least a portion of the one or more instructions to request the additional inventory of the item and adjust the value of the item;
- automatically adjusting, in response to receiving the indication of interaction via the web browser to execute the one or more instructions, inventory of the item with the additional inventory based on the one or more instructions being executed and the value of the item; and
- providing, for display via the web browser in response to adjusting the inventory of the item, at least one of an indication of the adjusted inventory of the item being requested at the second entity and the adjusted value of the item.

* * * * *